Figure 2:
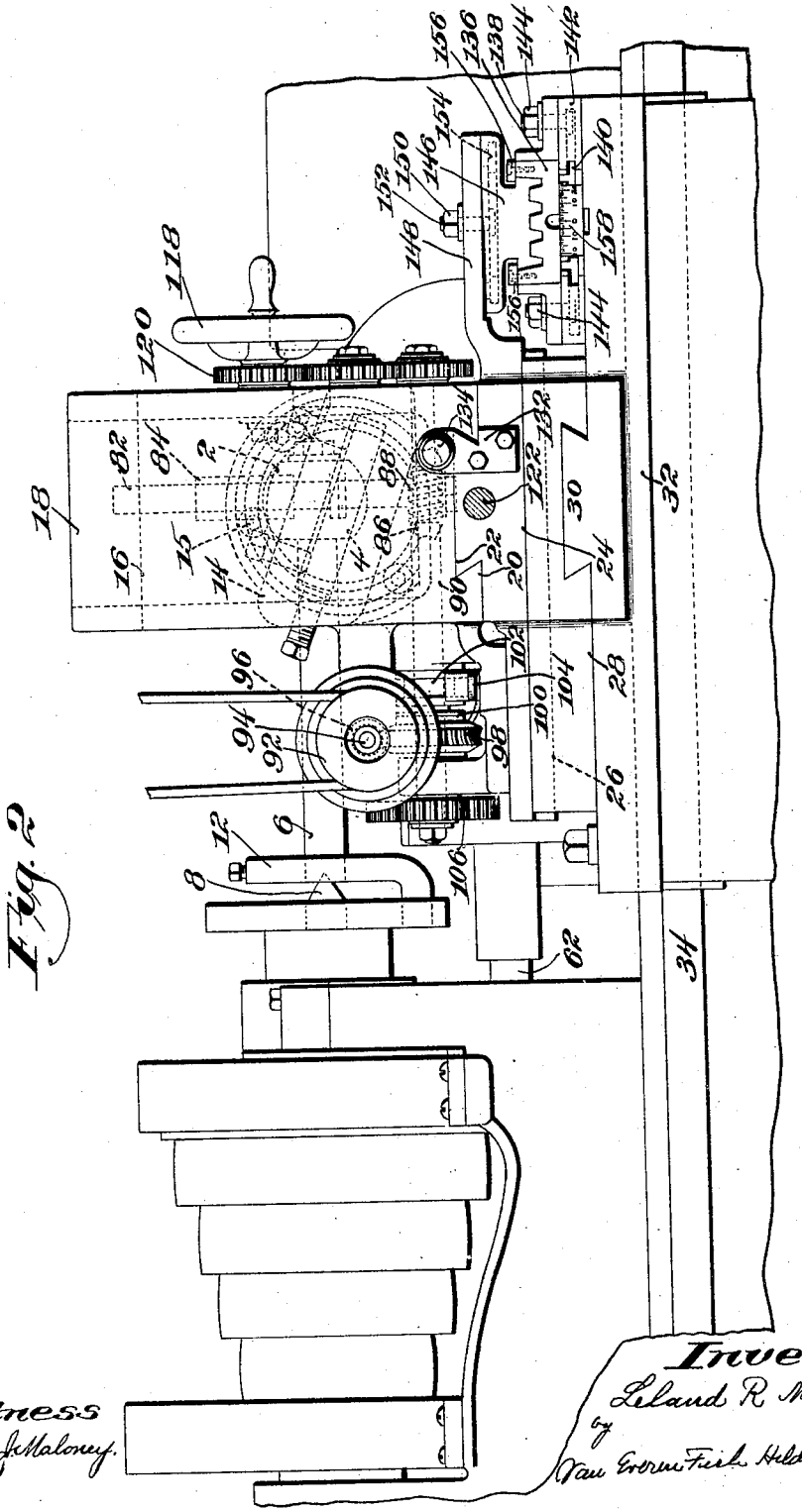

Jan. 28, 1930.   L. R. MAYO   1,744,783
MACHINE FOR RELIEVING SPIRAL CUTTERS
Filed April 18, 1925   3 Sheets-Sheet 1

Fig. 1

Witness
Jas J Maloney.

Inventor
Leland R Mayo
by
Van Everen Fish Hildreth & Carey
Attys

Jan. 28, 1930.　　　L. R. MAYO　　　1,744,783
MACHINE FOR RELIEVING SPIRAL CUTTERS
Filed April 18, 1925　　3 Sheets-Sheet 3

Witness
Jas. J. Maloney

Inventor
Leland R. Mayo
by
Van Everen Fish Hildreth & Cary
Attys

Patented Jan. 28, 1930

1,744,783

UNITED STATES PATENT OFFICE

LELAND R. MAYO, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND

MACHINE FOR RELIEVING SPIRAL CUTTERS

Application filed April 18, 1925. Serial No. 24,075.

The invention relates to a machine for relieving or backing off milling or analogous cutters having cutting edges which are inclined with respect to the direction of their movement relative to the work so as to effect a shearing cut.

While the invention is applicable to cutters which are of uniform diameter or of uniform taper, its more important application is to the backing off of form or contour cutters which have their cutting faces inclined with respect to the axis and usually conforming approximately to a helicoid.

In accordance with the present invention, the teeth of a cutter having cutting faces longitudinally inclined to the axis are backed off or relieved by relative backing-off movements between the revolving cutter and a tool having a cutting face longitudinally inclined to the axis of the cutter and having a cutting edge, which is progressively brought into cutting relation to the cutter by relative tangential movements between the cutter and tool, and the contour of which is a projection or approximately a projection from a radial plane normal to said tangential movement of the contour to be cut by the cutter.

For the sake of convenience and simplicity in the further explanation of the invention, the relative tangential movement will be considered to be a vertical movement of the tool and the relative backing-off movement will be considered to be a horizontal movement of the tool.
The active part of the cutting edge of the tool will be at and adjacent to its intersection with the horizontal plane through the axis of the cutter and since this point of intersection is caused to progress along the edge of the tool by reason of its inclination and vertical movement, the timing of the horizontal backing-off movements of the tool with relation to the rotation of the cutter is varied as the tool moves vertically. In order that the backing-off movements given to the tool may not result in a distortion or change in the shape of the contour of the cutter teeth from that which will produce the contour of which the tool edge is a projection, the inclination of the tool should theoretically at least be the same as the longitudinal inclination or angle of the cutter teeth. This theoretical condition may be maintained throughout the backing-off operation only in the case of cylindrical cutters since in the case of form cutters the longitudinal inclination or angle of the tooth edge varies with the diameter of the cutter at different points along the edge. By arranging the tool at an inclination which is the same as that of the cutter edge at a selected diameter between the largest and smallest diameters of the cutter and which may be termed a mean diameter the actual distortion may be rendered so slight as to be negligible except where there is a wide variation between the smallest and largest diameters of the cutter and extreme accuracy is required. In such case the contour of the tool may be varied slightly from the true projection above referred to to compensate for the distribution of the cutter teeth which would otherwise be produced. In like manner the contour of the tool edge may be varied from the true projection in case the faces of the teeth of the cutter to be relieved are undercut instead of radial.

Figure 3:
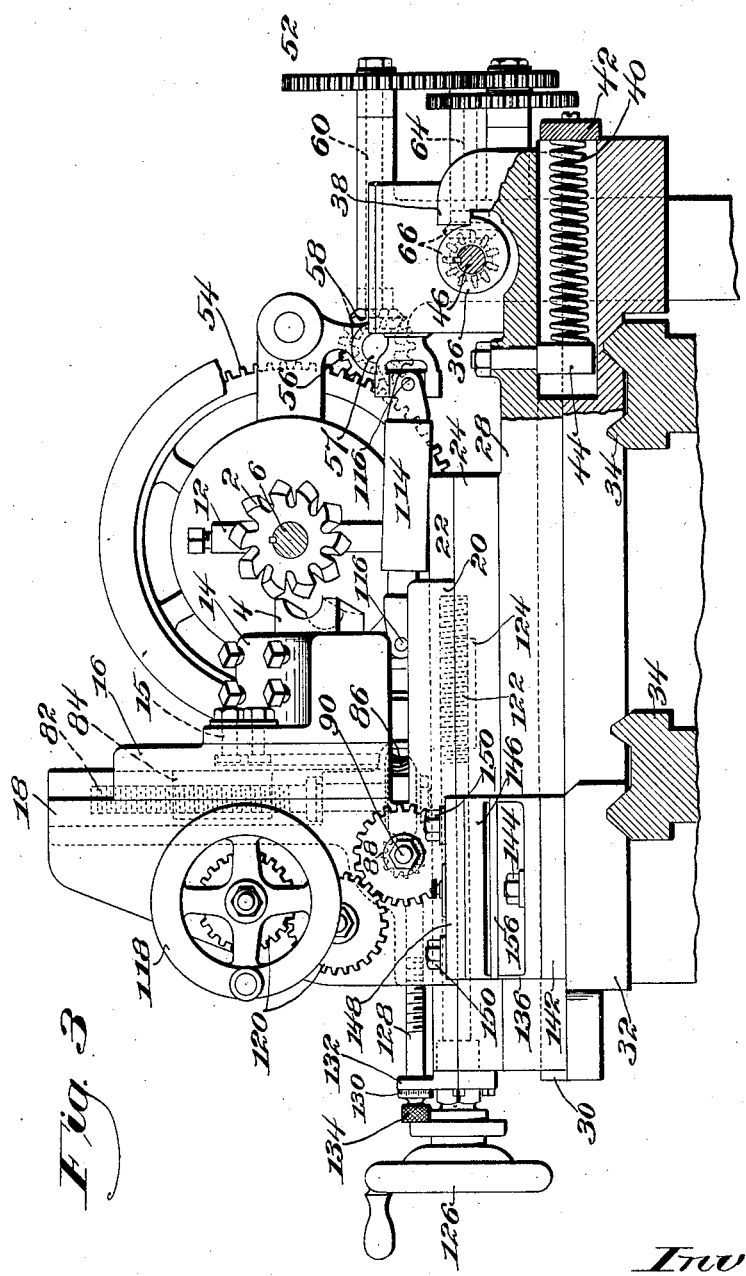

The invention will be further explained in connection with the machine shown in the accompanying drawings wherein Figure 1 is a plan view of the machine; Fig. 2 a front elevation; and Fig. 3 an end view looking toward the left in Fig. 2.

In the drawings the cutter to be relieved or backed off is indicated at 2. The cutter blank before the teeth have been formed thereon has a contour corresponding to that which the cutter is designed to produce and the teeth are formed in the usual manner by cutting inclined or spiral gashes in the blank so shaped that the faces of the teeth are helicoids radial on every cross section normal to the axis of the cutter. The back-off tool which is in the form of a flat plate 4 having a cutting edge in its upper face is held at an inclination to the axis of the cutter corresponding to the inclination of the cutter teeth at a diameter approximately midway between the largest and smallest. The contour of the cutting edges of the tool is a vertical projection from a horizontal plane of the contour of the cutter blank and this edge is brought progressively into active relation to the cutter by vertical movement of the tool during the backing-off operation. The tool is also advanced and retracted to act on the successive teeth during each rotation of the cutter. The timing of these backing-off movements of the tool with relation to the rotation of the cutter is varied as the tool moves vertically by accelerating the rotation of the cam by which they are effected.

As shown, the cutter 2 is secured upon a mandrel 6 which is supported between the head stock and tail stock centers 8 and 10 and is connected to rotate with the head stock spindle by a dog 12. The backing-off tool 4 is rigidly secured in a tool holder 14 carried by a vertical movable slide 16. The tool holder is in the form of a swivel head adjustably secured upon the slide by clamping bolts 15 so that its angular position may be varied to vary the inclination of the tool. The slide 16 is mounted to move vertically on a column 18 which is formed on a slide 20. The slide is held in fixed position, during the backing off, on the crossways 22 of a base plate 24. The base plate is mounted in horizontal ways 26 formed on a transversely reciprocating cross-slide 28 so that it may be moved in a direction parallel to the axis of the cutter during the transverse movements of the cross-slide if the character of the cutter renders it advisable to give the tool a backing-off movement inclined to the axis of the cutter. The cross-slide is mounted on the transverse ways 30 of a carriage 32 which is in turn mounted for adjustment on the ways 34 of the machine bed and is secured in fixed position thereon during the operation of the machine.

The cross-slide 28 is advanced and retracted to give the relieving or backing-off movements to the tool by a cam 36 which is mounted on the carriage 32 and is given one revolution for each tooth of the cutter. The cam acts on a bearing lug 38 which is formed on the rear end of the cross-slide and is held in engagement with the cam by a spring 40 interposed between a plate 42 on the rear end of the carriage 32 and a pin 44 on the cross-slide. The cam 36 is secured to a shaft 46 mounted in bearings 48 and 50 which are secured to the carriage 32. The shaft is driven from the head stock through change gearing which may be adjusted in accordance with the number of teeth in the cutter to give the cam one revolution for each tooth. The connections between the head stock spindle and the backing-off cam also include differential gearing for varying the timing of the cam as the backing-off tool is fed vertically. The change gearing is indicated at 52 and is driven from the head stock spindle gear 54 through a pinion 56 mounted on a shaft 57 and connected with one of two beveled pinions 58, the other of which is connected with a shaft 60 carrying one of the change gears. Motion is transmitted from the change gearing to a shaft 62 through shaft 64 and beveled pinions 66. The shaft 62 is in line with the backing-off of cam shaft 46 and is connected therewith through the differential gearing which varies the timing of the cam shaft. This gearing comprises a beveled gear 68 secured to end of the shaft 62 and engaging two beveled gears 70 which are mounted on a block 72 secured to the shaft 46 and engage a beveled gear 74 which is mounted to turn on the shaft. The hub of the beveled gear 74 is provided with a worm wheel 76 which is engaged by a worm 78 carried by a short shaft 80 mounted in the bearing bracket 50. Assuming that the beveled gear 74 is held stationary by the worm and worm wheel, the cam shaft 46 will be driven from the shaft 62 through the beveled gears 68 and 70 at one-half the speed of the shaft 62. The rotation of the cam shaft with relation to the shaft 62 and therefore with relation to the rotation of the head stock spindle and cutter may be varied, however, by rotation of the gear 74 through the worm and worm wheel. The gear is thus rotated through gearing which connects the shaft 80 with the mechanism for moving the backing-off tool vertically and which may be adjusted to vary the timing of the cam in accordance with the circular pitch at the mesne diameter.

The mechanism for vertically feeding the backing-off tool comprises a vertical feed screw 82 mounted in the column 18 and engaging a nut 84 on the tool slide 16. The lower end of the feed screw is provided with a worm wheel 86 which is engaged by a worm 88 carried by a horizontal feed shaft 90 mounted on the slide 20. The feed shaft 90 is driven from a cone pulley 92 secured to a shaft 94 which is mounted in the slide 20 and is provided with a worm 96 engaging a worm wheel 98 loosely mounted on the shaft 90. The worm wheel is provided with a clutch member 100 adapted to be engaged by a clutch 102 which is connected to slide on the shaft 90 and may be engaged and disengaged by the operator through a lever 104. The tool slide 16 may be manually adjusted or moved vertically by means of a hand wheel 118 mounted on the right hand side of the column 18 and connected with the end of the feed shaft by gearing 120.

The timing of the backing-off cam is controlled from the feed shaft 90 through connections between the shaft and the worm shaft 80 which include change gears 106. These gears may be adjusted to secure the requisite acceleration of the cam as the cutting-off tool is moved vertically. The change gears connect the feed shaft 90 with a short parallel shaft, the inner end of which carries a beveled gear 108 engaging a gear 110 which is secured to the forward end of a shaft 112 mounted in a bracket secured to the slide 20. The rear end of the shaft 112 is connected by an extensible shaft 114 and universal joints 116 with the forward end of the worm shaft 80.

The slide 20 may be adjusted transversely on the base plate 24 to so position the tool with relation to the cutter that it will remove the desired amount of stock from the cutter teeth by a screw-threaded shaft 122 mounted in the base plate and engaging a nut 124 on the slide. The front end of the shaft is provided with a hand wheel 126 by which it may be operated. The position of the slide on the base plate may be determined by a stop screw 128, the inner end of which is threaded in the slide and the outer end of which is provided with a flange 130 adapted to engage the outer face of a stop plate 132 which is secured to the forward end of the base plate and which surrounds the screw. The flange may be graduated to indicate the adjustment of the stop screw and the outer end of the screw is provided with a knurled head 134 by which it may be operated. These stop devices limit the inward adjustment of the tool carrying slide 20 and determine the depth of cut taken by the backing-off tool.

In backing off form cutters, portions of which are steep or nearly at right angles to the axis, it is desirable to give the backing-off tool a backing-off movement which is inclined rather than at right angles to the axis of the cutter in order to give the requisite clearance back of the steep portions of the cutting edges. Means is accordingly provided for varying the direction of the backing-off movements imparted to the backing-off tool. As shown, this means comprises two cooperating guiding devices, one on the base plate 24 and the other on the carriage 32 which determine the direction of the advanced movement of the backing-off tool. These guiding devices comprise a swivel guide plate 136 secured in adjusted position by bolts 138, the heads of which engage undercut angular grooves 140 formed in a plate 142 which is in turn secured in fixed position on the carriage 32. The bolts carry clamping nuts 144 engaging flanges on the guide plate. The plate is provided with a series of guiding grooves and ribs which are engaged by complementary ribs and grooves on a swivel block 146 which is secured in adjusted position on the underside of an arm 148 projecting from the base plate 24. The block is secured in position by clamping nuts 150 carried by bolts 152 which extend through the holes in the arm 148 and have heads engaging an annular undercut groove 154 in the swivel block. The guiding grooves and ribs are held snugly in engagement by plates 156 secured to the guide plate 136 and overlying flanges on the block 146.

By adjustment of the swivel plate 136 and the swivel block 146, the direction of movement of the backing-off tool as the cross-slide 28 is advanced and retracted by the backing-off cam may be varied to secure a movement at right angles to the axis of the cutter or to secure a movement inclined either to the right or to the left to any desired degree. A scale 158 may be provided for indicating the adjustment for different degrees of inclination.

In utilizing the above machine to back off the spiral teeth of a form cutter, the cutting edge of the backing-off tool is given a contour which, with the tool held at the predetermined angle to the axis of the cutter, is a vertical projection from the horizontal plane of the contour of the cutter blank before the teeth are cut thereon or, in other words, the contour which the cutter is designed to cut and which its teeth trace in the horizontal plane through its axis. The angle at which the tool should be held is dictated by the angle or inclination of the cutter teeth and by the contour of the cutter and may correspond to the angle of the cutter teeth at a mense diameter selected to give a minimum or immaterial distortion of the cutter contour during the backing off. The backing-off tool is rigidly secured in the tool holder and the vertical slide 16 is so adjusted that the higher end of the cutting edge of the tool is in the horizontal plane through the axis of the cutter which, for convenience, may be termed the cutting plane. The tool is also positioned for the desired depth of cut by adjustment of the slide 20 on the base plate 24, its position being determined by the stop screw 128. With the parts thus adjusted and, as shown, the higher or left hand end of the tool edge will act on the left hand ends of the cutter teeth and as each tooth travels through the cutting plane, the tool will be advanced horizontally by the backing-off cam 26. At the same time the feed mechanism gives the tool a slow vertical movement which brings its edge progressively into action and causes the point at which the tool edge intersects the cutting plane to travel along the edge from left to right. As the point of operation on the cutter progresses from left to right, the edge of each cutter tooth at the point of operation reaches the cutting plane at an increasingly earlier point in the rotation of the cutter and the backing-off cam is therefore advanced with relation to the cutter by the differential gearing connecting it with the feed mechanism, in order that the advance of the tool may be maintained in time with the travel of the cutter teeth at the point of operation. When the point of operation has reached the right hand end of the tool edge, a backing-off chip will have been removed from the cutter teeth from end to end of the cutter. The tool may then be returned to initial position and reset to take another chip and the operation repeated until sufficient stock has been removed back of the cutting edges to properly back off or relieve the teeth. The backing-off movements of the tool will be at right angles to the axis of the cutter or inclined either to the right or to the left depending upon the adjustment of the guiding plate 136 and cooperating block 146.

Since the inclination of the tool differs slightly from the inclination of the cutter edges except at the selected mesne diameter above referred to, the tool edge close to its point of intersection with the cutting plane may, during the backing-off movement of the tool, cut slightly deeper than at such point with a resulting slight distortion of the cutting edge from its true contour. Except in extreme cases, this distortion is more theoretical than actual and is negligible. In extreme cases it may be eliminated by a compensating variation in the contour of the tool edge from a true projection of the cutter contour. In such case the tool edge may be given the requisite contour by first forming a single tooth cutter having the contour of the cutter to be backed off, backing off this tooth by hand methods and then using this cutter in the machine to generate the desired contour on the unhardened tool, the operation being the reverse of the backing-off operation. In like manner the tool may be given the contour requisite for backing off cutters having tooth faces which are undercut rather than radial.

What is claimed is:

1. A machine for relieving the teeth of cutters having cutting faces longitudinally inclined to the axis of the cutter having, in combination, cutter rotating mechanism, a tool carrying cross-slide, a tool holder provided with means for holding a backing-off tool at an inclination to the axis of the cutter, means for reciprocating the cross-slide during each revolution of the cutter as many times as there are teeth in the cutter, a base plate carrying the tool holder and mounted to slide longitudinally on the cross-slide, guiding devices for the base plate adjustable to hold it from longitudinal movement or to move it longitudinally during the reciprocation of the cross-slide, and means for feeding the tool holder vertically during successive revolutions of the cutter.

2. A machine for relieving the teeth of cutters having cutting faces longitudinally inclined to the axis of the cutter having, in combination, cutter rotating mechanism, a tool carrying cross-slide, a tool holder for holding a backing-off tool at an inclination to the axis of the cutter, means for reciprocating the cross-slide during each revolution of the cutter as many times as there are teeth in the cutter, a base plate carrying the tool holder and mounted for longitudinal movement on the cross-slide, a guide block angularly adjustable on the base plate and provided with transverse guiding grooves and ribs, a relatively fixed and angularly adjustable guide plate provided with complementary guiding grooves and ribs, and means for feeding the tool holder vertically during successive revolutions of the cutter.

In testimony whereof I have signed my name to this specification.

LELAND R. MAYO.